(12) United States Patent
Kamran et al.

(10) Patent No.: US 11,055,028 B1
(45) Date of Patent: Jul. 6, 2021

(54) STORAGE SYSTEM WITH REDUCED READ LATENCY

(71) Applicant: EMC IP Holding Company LLC, Hopkinton, MA (US)

(72) Inventors: Lior Kamran, Rishon LeZion (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/780,103

(22) Filed: Feb. 3, 2020

(51) Int. Cl.
*G06F 3/06* (2006.01)

(52) U.S. Cl.
CPC ............ *G06F 3/0659* (2013.01); *G06F 3/067* (2013.01); *G06F 3/0611* (2013.01)

(58) Field of Classification Search
CPC ....... G06F 3/0659; G06F 3/067; G06F 3/0611
See application file for complete search history.

(56) References Cited

U.S. PATENT DOCUMENTS

| | | |
|---|---|---|
| 7,165,155 B1 | 1/2007 | Duprey et al. |
| 7,440,982 B2 | 10/2008 | Lu et al. |
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |

(Continued)

FOREIGN PATENT DOCUMENTS

| | | |
|---|---|---|
| WO | 2016111954 A1 | 7/2016 |
| WO | PCT/US2019/024885 | 1/2020 |
| WO | PCT/US2019/024900 | 1/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Kalpit Parikh
(74) *Attorney, Agent, or Firm* — Ryan, Mason & Lewis, LLP

(57) ABSTRACT

A processing device is configured to receive a plurality of input-output requests in a storage system, the input-output requests comprising read requests and write requests, to determine priorities of respective ones of the read requests, to place one or more of the read requests each having a relatively low priority in a first one of a plurality of queues in one of a plurality of processing cores of the storage system, to place one or more of the read requests each having a relatively high priority in a second one of the plurality of queues in the processing core, and to place the write requests in the first queue. The storage system services the read requests and the write requests from their corresponding ones of the first and second queues, illustratively resulting in reduced read latency for one or more relatively high priority read requests placed in the second queue.

20 Claims, 8 Drawing Sheets

(56) References Cited

U.S. PATENT DOCUMENTS

| | | | |
|---|---|---|---|
| 9,716,754 | B2 | 7/2017 | Swift |
| 10,152,232 | B1 | 12/2018 | Kleiner et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,474,496 | B1 | 11/2019 | Kamran et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2012/0203986 | A1* | 8/2012 | Strasser ............... G06F 3/0688 711/158 |
| 2013/0305002 | A1 | 11/2013 | Hallak et al. |
| 2013/0325824 | A1 | 12/2013 | Shoens |
| 2013/0326249 | A1* | 12/2013 | Navarro ............... G06F 3/0659 713/320 |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185529 | A1 | 6/2017 | Chhabra et al. |
| 2017/0192857 | A1 | 7/2017 | Meiri et al. |
| 2018/0095873 | A1 | 4/2018 | Nakagoe et al. |
| 2019/0303490 | A1 | 10/2019 | Chen et al. |
| 2019/0354496 | A1* | 11/2019 | Nielsen ............... G06F 3/0659 |
| 2019/0392060 | A1 | 12/2019 | Meiri et al. |
| 2020/0026616 | A1 | 1/2020 | Hu et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. on Jul. 28, 2017, and entitled "Token-Based Data Flow Control in a Clustered Storage System."

U.S. Appl. No. 15/793,121 filed in the name of David Meiri et al. on Oct. 25, 2017, and entitled "Opportunistic Compression of Replicated Data in a Content Addressable Storage System."

U.S. Appl. No. 15/824,536 filed in the name of Christopher Sayles et al. on Nov. 28, 2017, and entitled "Storage System with Asynchronous Messaging between Processing Modules for Data Replication."

U.S. Appl. No. 16/253,793 filed in the name of Yuval Harduf et al. on Jan. 22, 2019, and entitled "Storage System with Data Consistency Checking in Synchronous Replication Using Active Snapshot Set."

U.S. Appl. No. 16/265,131 filed in the name of Lior Kamran et al. on Feb. 1, 2019, and entitled "Storage System with Write Cache Release Protection."

U.S. Appl. No. 16/343,942 filed in the name of Yonatan Shtarkman et al. on Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. on Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. on Apr. 29, 2019, and entitled "Storage System with Deduplication-Aware Replication Implemented Using a Standard Storage Command Protocol."

U.S. Appl. No. 16/413,050 filed in the name of Xiangping Chen et al. on May 15, 2019, and entitled "Storage System with Coordinated Recovery across Multiple Input-Output Journals of Different Types."

U.S. Appl. No. 16/663,524 filed in the name of Xiangping Chen et al. on Oct. 25 2019, and entitled "Storage System with Throughput-Based Timing of Synchronous Replication Recovery."

U.S. Appl. No. 16/665,651 filed in the name of Lior Kamran et al. on Oct. 28 2019, and entitled "Recovery Flow with Reduced Address Lock Contention in a Content Addressable Storage System."

U.S. Appl. No. 16/251,779 filed in the name of Amitai Alkalay et al. on Jan. 18, 2019, and entitled "Multi-Core Processor in Storage System Executing Dedicated Polling Thread for Increased Core Availability."

U.S. Appl. No. 16/251,868 filed in the name of Amitai Alkalay et al. on Jan. 18, 2019, and entitled "Multi-Core Processor in Storage System Executing Dynamic Thread for Increased Core Availability."

* cited by examiner

STORAGE SYSTEM WITH REDUCED READ
LATENCY

FIELD

The field relates generally to information processing systems, and more particularly to storage in information processing systems.

BACKGROUND

Storage arrays and other types of storage systems are often shared by multiple host devices over a network. Applications running on the host devices each include one or more processes that issue input-output (TO) operations for delivery to storage ports of the storage system. The storage system may be implemented as a distributed storage system comprising multiple nodes. Nodes of a distributed storage system may each include multi-core processors that handle IO operations, such as read requests and write requests, received from one or more of the host devices over the network.

Different types of IO operations experience different types of latency. For example, write requests are typically acknowledged relatively quickly back to the respective sending host devices by the storage system. In some implementations, the storage system temporarily stores such write requests in a write cache, and possibly also a write journal, from which they are later "destaged" to a persistent data storage location. Such destaging generally occurs in an asynchronous manner relative to the acknowledgement of the write request back to the host. However, read requests are often executed in a synchronous manner, possibly by first reading metadata from one or more metadata structures and then using the metadata to read the actual data from a persistent data storage location. Multiple accesses to persistent data storage can therefore be required to service a given read request, possibly resulting in a significant latency in returning the requested data to the host device.

Moreover, typical conventional approaches do not adequately differentiate between read requests and write requests in queuing those requests for servicing in the storage system. As a result, in the presence of write pressure, which can arise when there is a moderate to significant write load on the storage system, synchronous read requests can get "stuck" behind asynchronous write requests, such that the latency of the read requests is further increased. Accordingly, write pressure can lead to even longer delays in returning requested data back to the host devices, possibly leading to read request timeouts or other undesirable conditions.

SUMMARY

Illustrative embodiments provide read latency reduction in the presence of write pressure in a storage system. Such arrangements can provide substantially improved performance in situations in which a storage system is experiencing write pressure, by ensuring that processing of write requests does not unduly delay processing of read requests. For example, some embodiments are advantageously configured to accelerate relatively high priority synchronous read requests that involve accessing address-to-hash tables, hash-to-physical tables or other metadata structures of a distributed content addressable storage (CAS) system. Similar advantages are provided in a wide variety of other types of storage systems.

In one embodiment, at least one processing device comprises a processor coupled to a memory. The at least one processing device is configured to receive a plurality of IO requests in a storage system, the IO requests comprising read requests and write requests, to determine priorities of respective ones of the read requests. The at least one processing device is further configured to place one or more of the read requests each having a relatively low priority in a first one of a plurality of queues in one of a plurality of processing cores of the storage system, to place one or more of the read requests each having a relatively high priority in a second one of the plurality of queues in the processing core, and to place the write requests in the first queue. The storage system services the read requests and the write requests from their corresponding ones of the first and second queues. The placing of the one or more relatively high priority read requests in the second queue reduces read latency of those one or more read requests relative to that which would otherwise result if all of the read requests and the write requests were placed in the first queue.

The at least one processing device in some embodiments comprises at least a subset of the plurality of processing cores of the storage system, although other arrangements are possible.

The one or more read requests each having a relatively low priority illustratively comprise read requests associated with asynchronous process flows, and the one or more read requests each having a relatively high priority illustratively comprise read requests associated with synchronous process flows.

In some embodiments, the storage system illustratively comprises one or more non-volatile memory (NVM) storage device drivers each coupled to one or more NVM storage devices of the storage system, with the NVM storage device drivers being configured to select particular ones of the read requests and the write requests from their corresponding ones of the first and second queues.

In some embodiments, the first queue illustratively comprises an NVM submission queue implemented as an NVM weighted round robin class queue. The NVM weighted round robin class queue may be paired with a corresponding NVM completion queue and assigned a relatively low one of a plurality of possible priority levels available for assignment to the NVM weighted round robin class queue. The second queue in one or more such embodiments illustratively comprises an NVM submission queue implemented as an NVM urgent class queue, with the NVM urgent class queue being paired with a corresponding NVM completion queue. It is to be appreciated, however, that a wide variety of other queue types and implementations can be used in other embodiments.

The processing core comprising the first and second queues in some embodiments further comprises a third queue. Such an embodiment is illustratively configured to detect a condition indicating that IO requests placed in the first queue are being underserviced or "starved" by the storage system, and responsive to the detected condition, to at least temporarily place one or more additional received read requests each having the relatively high priority in the third queue instead of in the second queue.

The third queue in some embodiments comprises an NVM submission queue implemented as an NVM weighted round robin class queue, but is illustratively assigned an intermediate one of a plurality of possible priority levels available for assignment to the NVM weighted round robin class queue.

In embodiments in which the first queue and the third queue comprise respective ones of a plurality of weighted round robin queues, a weight assigned to the third queue is illustratively greater than a weight assigned to the first queue. Queues using selection mechanisms other than weighted round robin can be used in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
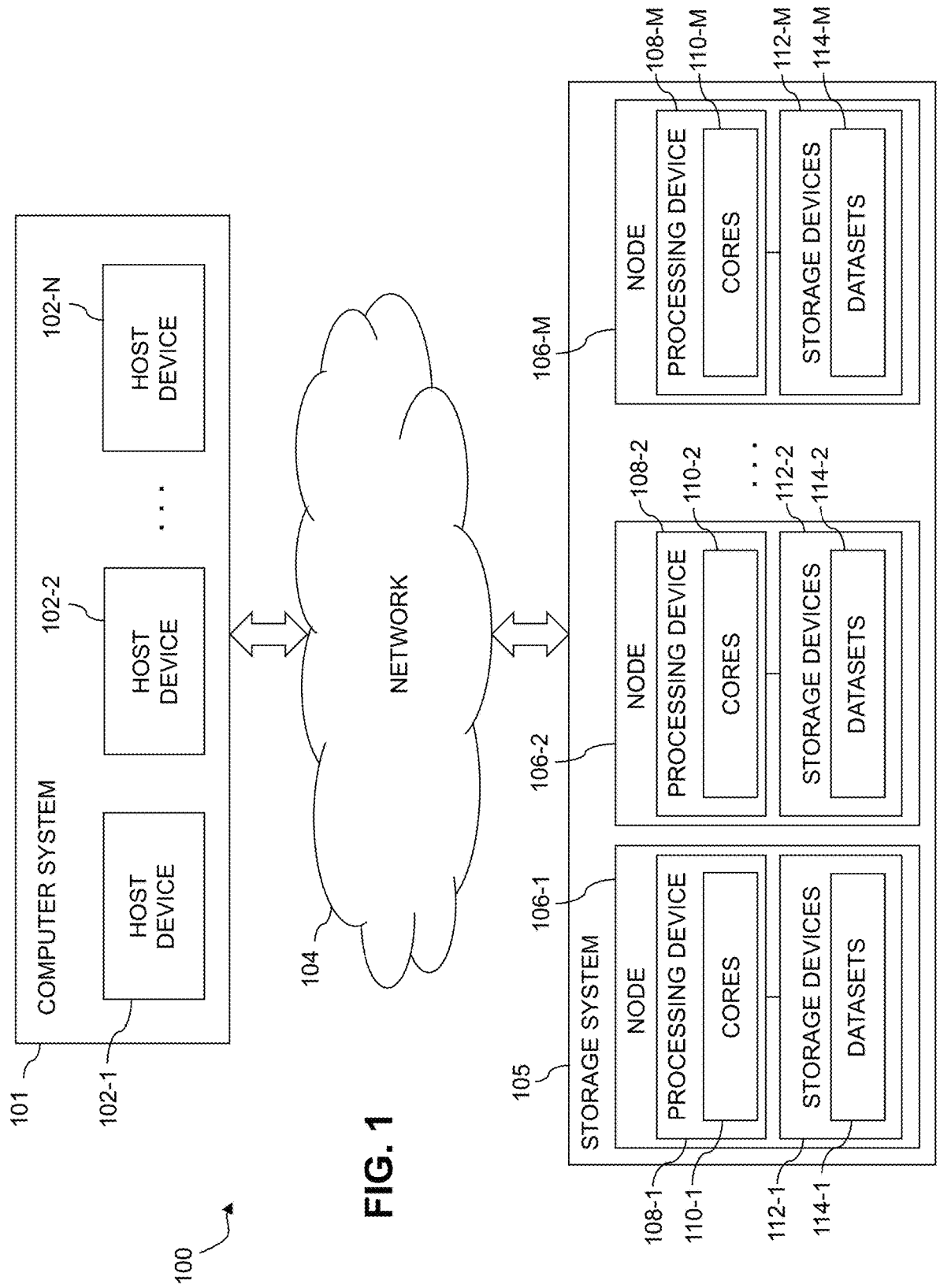
FIG. 1 is a block diagram of an information processing system comprising a storage system configured with read latency reduction functionality in an illustrative embodiment.

FIG. 1 shows an information processing system 100 configured in accordance with an illustrative embodiment. The information processing system 100 comprises a computer system 101 that includes host devices 102-1, 102-2, . . . 102-N, collectively referred to herein as host devices 102. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102. Such applications illustratively generate input-output (IO) operations that are processed by the storage system 105. The term "input-output" as used herein refers to at least one of input and output. For example, IO operations may comprise write requests and/or read requests directed to logical addresses of particular logical storage volumes of the storage system 105. These and other types of IO operations are also generally referred to herein as IO requests.

The host devices 102 and storage system 105 illustratively comprise respective processing devices of one or more processing platforms. For example, the host devices 102 and the storage system 105 can each comprise one or more processing devices each comprising a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network such as a 4G or 5G network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of nodes 106-1, 106-2, . . . 106-M, collectively referred to herein as nodes 106. The storage system 105 comprising nodes 106 is an example of what is also referred to herein as a "distributed storage system" or a "clustered storage system." For example, in some implementations of storage system 105, the nodes 106 are interconnected in a full mesh network, such that each of the nodes 106 can communicate with each of the other nodes 106, although other types of networks and different node interconnection arrangements can be used in other embodiments. At least portions of respective ones of the nodes 106 illustratively implement what is generally referred to herein as a "distributed storage controller" of the storage system 105.

In the FIG. 1 embodiment, the nodes 106-1, 106-2, . . . 106-M of the storage system 105 comprise respective processing devices 108-1, 108-2, . . . 108-M, collectively referred to herein as processing devices 108. One or more of the nodes 106 may each comprise multiple processing devices 108, although only single instances of such processing devices are shown in the figure. In some embodiments, multiple processing devices 108 of a given one of the nodes 106 may act or function as a single processing device 108.

The processing devices 108-1, 108-2, . . . 108-M comprise respective sets of cores 110-1, 110-2, . . . 110-M, collectively referred to herein as cores 110. For example, a given processing device 108 may comprise a set of two cores 110, four cores 110, eight cores 110, or any other number of cores 110 appropriate to a given implementation. The processing devices 108 therefore each illustratively comprise a multi-core processor and associated memory.

The nodes 106-1, 106-2, . . . 106-M further comprise respective sets of storage devices 112-1, 112-2, . . . 112-M, collectively referred to herein as storage devices 112. For example, a given one of the nodes 106 may comprise a single storage device 112, two storage devices 112, four storage devices 112, eight storage devices 112, sixteen storage devices 112, thirty-two storage devices 112 or any other number of storage devices 112. The storage devices 112-1, 112-2, . . . 112-M store respective datasets 114-1, 114-2, . . . 114-M, collectively referred to herein as datasets 114, which illustratively comprise logical units (LUNs) or other types of logical storage volumes, as well as snapshots and/or other arrangements of data, possibly including associated metadata, as in an embodiment in which storage devices 112 store user data pages and metadata pages of LUNs or other logical storage volumes.

The storage devices 112 of the storage system 105 illustratively comprise solid state drives (SSDs). Such SSDs are implemented using non-volatile memory (NVM) devices such as flash memory. Other types of NVM devices that can be used to implement at least a portion of the storage devices 112 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in storage system 105 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 105 illustratively comprises a scale-out all-flash content addressable storage array such as an XtremIO™ storage array from Dell EMC of Hopkinton, Mass. A wide variety of other types of storage arrays can be used in implementing the storage system 105 in other embodiments, including by way of example one or more VNX®, VIVIAX®, Unity™ or PowerMax™ storage arrays, each commercially available from Dell EMC.

Additional or alternative types of storage products that can be used in implementing a given storage system in illustrative embodiments include, by way of example, software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to storage systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

The storage system 105 should also be understood to include additional modules and other components typically found in conventional implementations of storage systems, although such additional modules and other components are omitted from the figure for clarity and simplicity of illustration.

In some embodiments, communications between the host devices 102 and the storage system 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 102 to communicate with the storage system 105 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP. Such NVMe protocols are more generally referred to herein as NVM protocols, and are illustratively implemented using NVM storage devices and associated NVM storage device drivers.

As indicated previously, the host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102. In the FIG. 1 embodiment, storage system 105 is implemented as a distributed or clustered storage system comprising nodes 106 that may be logically or physically distributed.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 7 and 8.

It is to be appreciated that the above-described features and other features of illustrative embodiments disclosed herein are presented by way of example only and should not be construed as limiting in any way.

The particular sets of modules and other components implemented in the system 100 as illustrated in FIG. 1 are therefore presented by way of illustrative example only. In other embodiments, only subsets of these components, or additional or alternative sets of components, may be used, and such components may exhibit alternative functionality and configurations. Accordingly, different numbers, types and arrangements of system components such as host devices 102, network 104, storage system 105, nodes 106, processing devices 108, cores 110, storage devices 112, and datasets 114, or additional or alternative components, can be used in other embodiments.

Also, in some embodiments, the read latency reduction functionality described herein can be implemented at least in part in one or more host devices, or partially in a host device and partially in a storage system. Accordingly, illustrative embodiments are not limited to arrangements in which all such functionality is implemented in a storage system, and therefore encompass various hybrid arrangements in which the functionality is distributed over one or more storage systems and one or more associated host devices, each comprising one or more processing devices.

Figure 2:
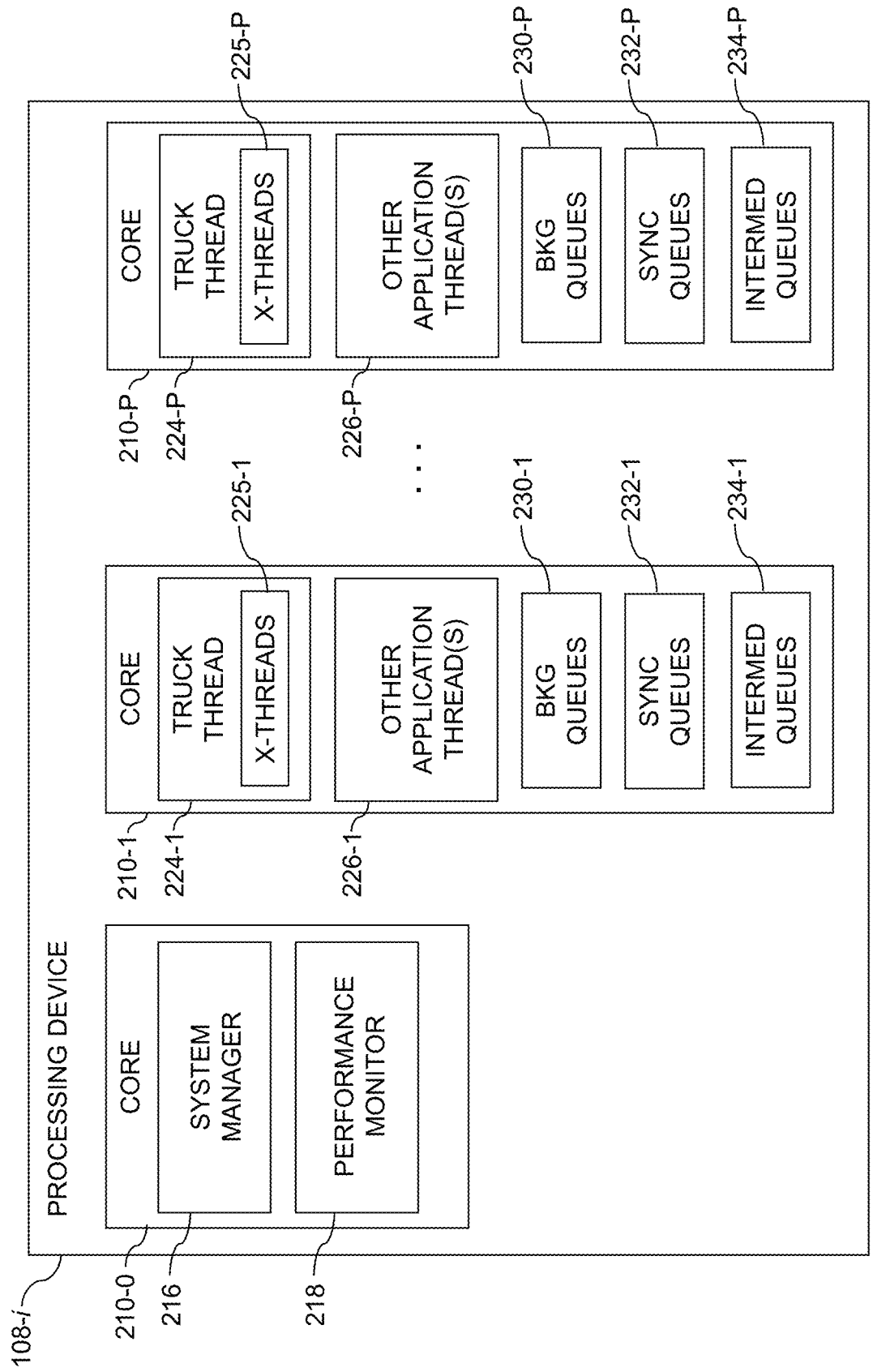
FIG. 2 is a block diagram of a processing device of the information processing system of FIG. 1 comprising a plurality of processing cores each comprising multiple distinct queues in an illustrative embodiment.

Referring now to FIG. 2, a given one of the processing devices 108, denoted as processing device 108-$i$, where i=1, 2, . . . M, is shown in more detail. The processing device 108-$i$ in this embodiment comprises a multi-core processor including processing cores 210-0, 210-1, . . . 210-P. The processing core 210-0 implements a system manager 216 and a performance monitor 218. The other processing cores 210-1 through 210-P execute respective truck threads 224-1 through 224-P, comprising respective sets of multiple sub-threads illustratively in the form of X-threads 225-1 through 225-P. Other types of sub-threads can be used in other embodiments. The processing cores 210-1 through 210-P also execute respective sets of one or more other application threads 226-1 through 226-P. These and other threads illustratively comprise operating system (OS) threads of their respective cores 210.

For example, in the case of a block-storage application, which handles the block-based storage functionality of the storage system 105, the block-storage application executes truck threads 224 on respective ones of the cores 210 of the processing device 108-$i$. These truck threads 224 implement the block-storage application functionality. In some embodiments, each of the truck threads 224 may be hard affined to a particular one of the processing cores 210, such that it may only execute on that particular core.

The processing cores 210 in some embodiments illustratively comprise respective distinct central processing units (CPUs). Accordingly, each of the processing devices 108 of the respective nodes 106 of storage system 105 may be viewed as comprising a multi-core CPU and an associated storage array comprising a set of storage devices 112, although numerous other arrangements are possible. The storage array or other arrangement of storage devices 112 associated with a given one of the nodes 106 may comprise, for example, a disk array enclosure (DAE), although such references herein to "disks" should not be construed as an indication that the storage devices are limited to HDDs or other rotating magnetic storage media.

The above-noted multi-core CPU illustratively runs the block-storage application on top of a preemptive OS, where a preemptive OS can preempt (e.g., stop) a running OS thread without its cooperation, and execute something else, such as another OS thread. The block-storage application is illustratively running a single hard-affined OS thread per each CPU core, which implements the block-storage functionality. This OS thread is an example of what is also referred to herein as a "truck thread." Truck threads and other application threads running on a given CPU core or other processing core are more generally referred to herein as "core threads" of that processing core.

As part of its operation, each of the truck threads 224 polls a corresponding set of interfaces of the storage system 105 for tasks, events, or other data to be processed by that truck thread. For example, the set of interfaces may include an interface for indications of completions of submitted TO requests, an interface for TO requests from the user, and interfaces for other tasks, events, or other data. Any other interfaces may also be polled. Each truck thread, by design, fully utilizes the processing core that it is executing on for both interface polling and processing of the corresponding tasks, events, or other data. For example, in illustrative embodiments, each truck thread is designed to fully utilize the processing core that it is executing on because, even when there is no actual processing of tasks to be performed, the truck thread continues checking its respective interfaces via polling. This design is optimized for a storage system that requires low latency and high IO operations per second (IOPS) since no context switches or interrupts are required to perform the processing. In some embodiments, the functionality of the block-storage application may be described as an always-polling model.

In some embodiments, example interfaces that may be polled by a truck thread may include a front-end interface, a remote procedure call (RPC) messaging interface, a remote direct memory access (RDMA) messaging interface, and a back-end interface. In some embodiments, any other interface commonly used in a storage system may also be polled by the truck thread. In some embodiments, each truck thread defines an IO-provider instance for each corresponding interface that it is responsible for polling.

The front-end interface illustratively comprises an interface for receiving and replying to IO requests from users of the storage system 105 associated with respective ones of the host devices 102. For example, a given truck thread may comprise a front-end IO-provider instance that polls for new IO requests from one or more host devices 102 or other system users. In some embodiments, for example, IO requests received by the storage system 105 from the user are pooled together in a common pool that is shared between the truck threads 224 and accessed using a front-end IO-provider instance.

The RPC messaging interface illustratively comprises an interface for sending and receiving messages to and from other nodes 106 of the storage system 105. For example, a given truck thread may comprise an RPC messaging IO-provider that polls for new messages from other nodes 106 in the storage system 105. As an example, when one of the nodes 106 sends an IO request to another one of the nodes 106, the sender node selects the specific destination truck thread, that is, the truck thread that will receive and handle the request.

The RDMA messaging interface illustratively comprises an interface for RDMA transfer of buffers between nodes 106. For example, a given truck thread may comprise an RDMA messaging IO-provider that polls for the completion of RDMA transfers between nodes 106. The back-end interface illustratively comprises an interface for accessing the storage devices 112 in order to write data to and read data from the storage devices 112. For example, a given truck thread may comprise a back-end IO-provider that polls for the completion of write and read requests initiated by the truck thread to one or more of the storage devices 112 of processing device 108-$i$.

In some cases, the storage system 105 may also implement one or more other applications aside from the block-storage application. For example, a file-storage application that provides a file interface to a user of the information processing system 100 may also be implemented by the storage system 105, for example, by executing corresponding threads 226 on one or more of the cores 210. In some cases, the block-storage application and the file-storage application, or any other application, may be implemented by the storage system 105 simultaneously, each with a different load that can dynamically change over time.

The processing cores 210 of the FIG. 2 embodiment can therefore execute threads of multiple applications, including truck threads 224 and other application threads 226. For example, in some embodiments, a block-storage application is implemented by executing truck threads 224 on respective ones of the cores 210, with each of the truck threads 224 implementing a corresponding portion of the block-storage application.

The performance monitor 218 is configured to monitor the performance of core threads, such as the truck threads 224 and other application threads 226 executing on respective ones of the processing cores 210. Such performance monitoring in illustrative embodiments involves collecting performance measurements from respective ones of the core threads. Examples of performance monitoring functionality that can be implemented in storage system 105 in some embodiments are disclosed in U.S. Pat. No. 10,152,232, entitled "Low-Impact Application-Level Performance Monitoring with Minimal and Automatically Upgradable Instrumentation in a Storage System," which is incorporated by reference herein. For example, U.S. Pat. No. 10,152,232 describes techniques for monitoring of storage system processing time dynamics at a flow level, in order to generate performance measurements that can be used for various purposes such as for the investigation and debugging of issues as well as for performance analysis of the storage system.

However, other performance monitoring techniques can be implemented in other embodiments, and illustrative embodiments should therefore not be viewed as being limited to use with any particular performance monitoring techniques, such as those disclosed in U.S. Pat. No. 10,152,232.

The processing device 108-$i$ of the storage system 105 is configured to implement read latency reduction functionality. Each of the other processing devices 108 is assumed to be similarly configured. This read latency reduction functionality of the processing device 108-$i$ will now be described in more detail.

Each of the processing cores 210 of the processing device 108-$i$ in this embodiment illustratively comprises a set of queues for holding received IO operations to be processed within the storage system, with the set of queues comprising one or more queues of a first type, one or more queues of a second type, and one or more queues of a third type. These queues of first, second and third types more particularly comprise BKG queues 230-1, SYNC queues 232-1 and INTERMEDIATE queues 234-1.

The BKG queues 230-1 are used for typical write requests and low priority read requests, such as those associated with background applications such as defragmentation, compression, rebuilding, destaging, etc. The SYNC queues 232-1 are used for high priority read requests, such as those associated with synchronous read operations involving accessing address-to-hash ("A2H") tables, hash-to-physical ("H2P") tables or other metadata structures of a distributed CAS system. The INTERMEDIATE queues 234-1 are used to alleviate any detected condition in which IO requests in the BKG queues 230-1 are being starved of processing resources, illustratively by holding high priority reads that are diverted from the SYNC queues 232-1 in conjunction with detection of such a starvation condition.

Each of the other processing cores 210 similarly comprises BKG queues 230, SYNC queues 232 and INTERMEDIATE queues 234, as indicated in the figure. For example, processing core 210-P comprises BKG queues 230-P, SYNC queues 232-P and INTERMEDIATE queues 234-P.

Additionally or alternatively, in some embodiments, each of the processing cores 210 comprises a different set of instances of BKG queues 230, SYNC queues 232 and INTERMEDIATE queues 234 for each of a plurality of the storage devices 112 of the corresponding storage node 106.

It is to be appreciated that other types and arrangements of queues can be used in the processing cores 210 in other embodiments.

In accordance with the read latency reduction functionality, a given one of the processing cores 210-1 of the processing device 108-i is illustratively configured to receive a plurality of IO requests, with the IO requests comprising read requests and write requests, to determine priorities of respective ones of the read requests, to place one or more of the read requests each having a relatively low priority in a BKG queue, to place one or more of the read requests each having a relatively high priority in a SYNC queue, and to place the write requests in the BKG queue. The BKG queue and the SYNC queue are examples of what are more generally referred to herein as respective first and second queues, and represent particular ones of the BKG queues 230-1 and SYNC queues 232-1 of the processing core 210-1. The other processing cores 210 are each assumed to be configured in a similar manner to place particular types of IO requests in particular ones of their BKG queues 230 and SYNC queues 232. The storage system 105 services the read requests and the write requests from their corresponding ones of the BKG queues 230 and SYNC queues 232.

In determining priorities of respective read requests, certain types of read requests are illustratively considered high priority read requests, such as read requests associated with synchronous process flows, while other read requests are considered low priority read requests, such as read requests associated with asynchronous process flows. A wide variety of different techniques can be used to "determine priorities" as that term is broadly used herein, and illustratively embodiments should therefore not be viewed as being limited to particular numbers, types, ranges or other characteristics of relative priorities between different read requests or other types of IO requests.

The placing of the one or more relatively high priority read requests in a given one of the SYNC queues 232-1 of processing core 210-1 reduces read latency of those one or more read requests relative to that which would otherwise result if all of the read requests and the write requests were instead placed in a given one of the BKG queues 230-1, or any other single queue of the processing core 210-1. Similar read latency reductions are achieved in other ones of the processing cores 210, through configuration and utilization of their BKG queues 230 and SYNC queues 232 as disclosed herein.

The one or more read requests each having a relatively low priority and placed in the given one of the BKG queues 230-1 illustratively comprise read requests associated with asynchronous process flows. Such read requests associated with the asynchronous process flows may comprise, for example, read requests associated with at least one of a defragmentation process, a compression process, a rebuilding process and a destaging process.

The one or more read requests each having a relatively high priority and placed in the given one of the SYNC queues 232-1 illustratively comprise read requests associated with synchronous process flows. Such read requests associated with the synchronous process flows may comprise, for example, read requests that involve at least one of reading metadata information from metadata structures, such as the above-noted A2H tables and H2P tables, and reading data using the metadata information.

As indicated previously, the storage system 105 in some embodiments comprises NVM storage devices for at least a portion of its storage devices 112. In such embodiments, the storage system 105 illustratively comprises NVM storage device drivers each coupled to one or more NVM storage devices of the storage system 105, with the NVM storage device drivers being configured to select particular ones of the read requests and the write requests from their corresponding ones of the BKG, SYNC and INTERMEDIATE queues.

The BKG queues 230 of the processing cores 210 in these and other embodiments illustratively comprise NVM submission queues implemented as respective NVM weighted round robin (WRR) class queues. Each such NVM submission queue implemented as an NVM WRR class queue is illustratively paired with a corresponding NVM completion queue, and may be assigned a relatively low one of a plurality of possible priority levels available for assignment to the NVM WRR class queue.

For example, in the case of NVMe, which utilizes a paired queuing arrangement with each pair comprising an IO submission queue (SQ) and an IO completion queue (CQ), the SQ is used to send IO requests to an NVMe drive, and the CQ is used to receive completions from the NVMe drive for the corresponding IO requests. Multiple paired instances of SQs and CQs can be used (e.g., up to 64K in total size for each NVMe drive) to increase parallelism and thereby provide enhanced performance. In addition, an administrative ("admin") SQ and associated admin CQ can be used for management, for example, to create and/or destroy instances of the above-noted IO SQs and CQs.

In conventional NVMe arrangements, there is typically a single SQ-CQ pair per NVMe drive per processing core. Such an arrangement avoids the need for a locking mechanism to synchronize access to the queues from different cores. However, as indicated previously herein, these and other conventional arrangements do not adequately differentiate between read requests and write requests in queuing those requests. As a result, in the presence of write pressure, synchronous read requests can get "stuck" behind asynchronous write requests, such that the latency of the read requests is unduly increased, possibly leading to read request timeouts or other undesirable conditions.

Such drawbacks of conventional practice are overcome in illustrative embodiments through the configuration and utilization of the BKG queues 230, SYNC queues 232 and INTERMEDIATE queues 234 in the processing cores 210 of each of the processing devices 108 of the respective storage nodes 106 of storage system 105.

For example, the NVMe storage protocol supports an arbitration mechanism with classes for submission queues, including an urgent class, as well as a WRR class with three levels, low, medium and high, and configurable weights. In accordance with the NVMe arbitration mechanism, any IO request placed in any urgent class submission queue will be fetched by the NVMe drive before other IO requests in any level of the WRR class submission queues. However, since there is a strict preference for the urgent class queues, simply utilizing urgent class queues for read requests can lead other IO requests in WRR class queues to be starved for processing resources, eventually leading to host timeouts. The configuration and utilization of the BKG queues 230, SYNC queues 232 and INTERMEDIATE queues 234 as disclosed herein illustratively exploits the NVMe arbitration mechanism in a manner that substantially reduces read latency for high priority read requests, such as synchronous read requests, without starving other types of IO requests for processing resources.

In accordance with the previous description, the BKG queues 230 of the processing cores 210 in some embodiments comprise respective NVMe WRR class SQs, each paired with a corresponding NVMe CQ, and assigned the low priority level of the three possible priority levels available for assignment to the NVMe WRR class queue.

In addition, the SYNC queues 232 comprise respective NVMe urgent class SQs, each paired with corresponding NVMe CQ.

Finally, the INTERMEDIATE queues 234 comprise respective NVM WRR class SQs, each paired with a corresponding NVMe CQ, and assigned the medium priority level of the three possible priority levels available for assignment to the NVMe WRR class queue.

In the foregoing example configuration of the BKG queues 230, SYNC queues 232 and INTERMEDIATE queues 234, it is assumed that the storage devices 112 comprise respective NVMe drives. In other embodiments, other types of storage devices and associated storage protocols can be used, and the configuration of the BKG queues 230, SYNC queues 232 and INTERMEDIATE queues 234 is adapted accordingly to conform to the particular queue types, priority types and arbitration mechanisms utilized by the other storage devices and their associated storage protocols. For example, other types of NVM storage protocols can be used, and illustrative embodiments should therefore not be viewed as limited to NVMe arrangements such as those described above. Also, particular queue types described above as being associated with particular selection mechanisms such as WRR can be varied in other embodiments, and references herein to WRR should therefore be considered as illustrative examples only. Numerous other selection mechanisms are known to those skilled in the art, and can be used in place of WRR in other embodiments.

Additional aspects of the read latency reduction functionality of processing core 210-1 of the processing device 108-*i* involve detecting starvation conditions relating to IO requests in the BKG queues 230-1.

For example, the processing core 210-1 is illustratively configured to detect a condition indicating that IO requests placed in a given one of the BKG queues 230-1 are being underserviced by the storage system 105, and responsive to the detected condition, to at least temporarily place one or more additional received read requests each having the relatively high priority in a corresponding one of the INTERMEDIATE queues 234-1 instead of in the given one of the BKG queues 230-1. The INTERMEDIATE queue is an example of what is more generally referred to herein as a third queue, and represents a particular ones of the INTERMEDIATE queues 234-1 of the processing core 210-1.

Again, the other processing cores 210 are each assumed to operate in a similar manner, with regard to starvation detection as that described above for processing core 210-1, through configuration and utilization of their BKG queues 230, SYNC queues 232 and INTERMEDIATE queues 234 as disclosed herein.

The BKG queues 230-1, SYNC queues 232-1 and INTERMEDIATE queues 234-1 are illustratively arranged in multiple sets of first, second and third queues, with each set comprising one of the BKG queues 230-1 as the first queue, one of the SYNC queues 232-1 as the second queue, and one of the INTERMEDIATE queues 234-1 as the third queue. Each of the sets may be associated with a different one of the storage devices 112-1 accessible to the corresponding processing device 108-1. The other BKG queues 230, SYNC queues 232 and INTERMEDIATE queues 234 of other ones of the processing cores 210 of processing device 108-1, and of other processing cores on other processing devices 108, are illustratively arranged in substantially the same manner.

In some embodiments, the BKG queues 230 and the INTERMEDIATE queues 234 comprise respective NVMe WRR class SQs with configurable weights, but the BKG queues 230 are assigned lower weights than the INTERMEDIATE queues 234. Numerous other arrangements are possible.

The above-described embodiments provide read latency reduction in the presence of write pressure in storage system 105, illustratively for high priority read requests such as synchronous read requests, but without starving any other particular type of IO requests for processing resources.

It is assumed that each of the other processing cores 210 operates in the manner described above for processing core 210-1. It is further assumed that each of the other processing devices 108 of the storage system 105 is configured in a manner similar to that illustrated in FIG. 2 for processing device 108-*i*.

In some embodiments, each of the processing devices 108 incudes its own system manager 216 and performance monitor 218. However, in other embodiments, it is possible that such components are implemented on only one of the processing devices 108, or on other subsets of the processing devices 108, in which case a system manager 216 and performance monitor 218 implemented on one of the processing devices 108 may provide similar system management and performance monitoring functionality for one or more other ones of the processing devices 108. It is therefore possible that one or more of the processing devices 108 may not include its own instances of system manager 216 and/or performance monitor 218. Also, although system manager 216 and performance monitor 218 are illustratively shown as executing on a separate core 210-0 in this embodiment, this is by way of example only, and in other embodiments, one or more of these components may each be distributed over multiple ones of the cores 210.

In some embodiments, storage system 105 may comprise a separate processing device that executes the system manager 216 and manages the truck threads 224 executing on the cores 210 of the processing devices 108 of the nodes 106.

Accordingly, in some embodiments, the execution and implementation of system manager 216 and/or performance monitor 218 may be distributed across multiple cores 210, processing devices 108, and/or nodes 106.

In some embodiments, the system manager 216 and performance monitor 218 collectively monitor the core utilization of one or more of the processing devices 108 and may dynamically control and change the modes in which the truck threads 224 and other application threads 226 operate in order to adapt the storage system 105 to actual usage patterns of the users associated with the host devices 102.

The operation of the information processing system 100 will now be described in further detail with reference to the illustrative embodiment of FIG. 3, which shows an example process that includes steps 300 through 316. The process shown in FIG. 3 is suitable for use in system 100 but is more generally applicable to other types of information processing systems in which a storage system is configured to implement read latency reduction functionality of the type disclosed herein.

Figure 3:
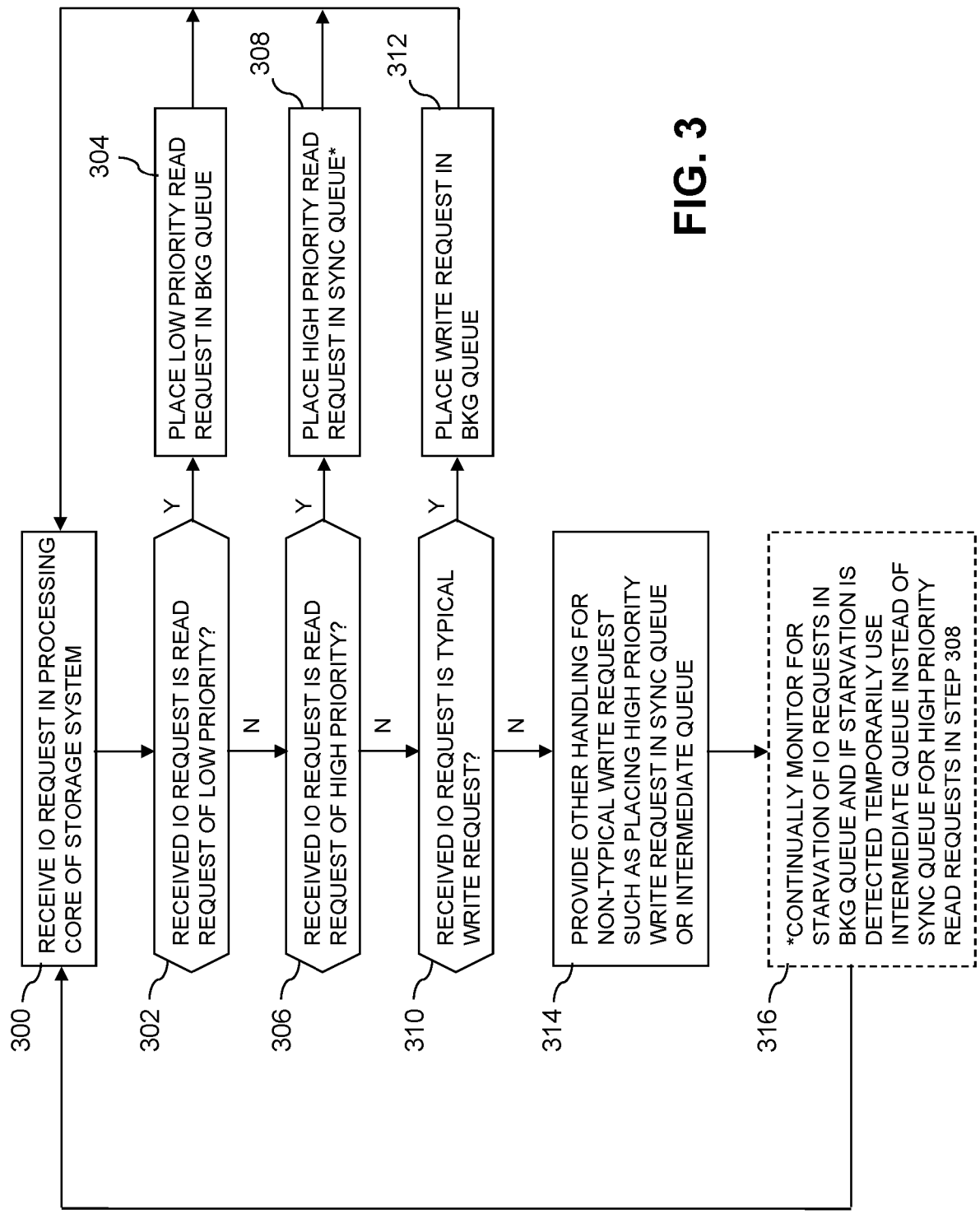
FIG. 3 is a flow diagram of an example read latency reduction process in an illustrative embodiment.

The steps of FIG. 3 are illustratively performed at least in part under the control of one or more processing devices 108 of one or more nodes 106 in storage system 105 of system 100. For example, in some embodiments, the steps of FIG. 3 may be performed under the control of system manager 216 executing on processing device 108-*i* of a corresponding one of the nodes 106 of the storage system 105. Some or all of the steps may be performed asynchronously relative to one another rather than serially as illustrated in the figures. Also, multiple instances of the process can be performed at least in part in parallel to one another for different sets of IO requests processed by different processing cores of processing device 108-*i*. It is further assumed that each of the other processing devices 108 executes similar processes for read latency reduction for sets of IO requests processed by their respective processing cores 210.

Referring now to FIG. 3, an example process is shown for read latency reduction in the presence of write pressure, and includes the steps as described below. It is assumed that a particular instance of the FIG. 3 process operates utilizing a set of queues of a processing core, with the set of queues including a BKG queue, a SYNC queue and an INTERMEDIATE queue, which are examples of what are more generally referred to herein as respective first, second and third queues. Other instances of the FIG. 3 process can be performed using other sets of queues in other processing cores, and possibly on other storage nodes 106. A given such set of queues may be associated in some embodiments with a particular one of the storage device 112 of the storage system 105

In step 300, an IO request is received for handling in a given processing core of the storage system, illustratively from a process of an application running on one of the host devices 102, or possibly from a process of an application running on the storage system, such as a background application executed by the storage system. Examples of such background applications include defragmentation, compression, rebuilding, destaging, etc.

In step 302, a determination is made as to whether or not the received IO request is a read request of low priority. If the received IO request is a low priority read request, the request is placed in the BKG queue in step 304, and then the process returns to step 300 to handle the next received IO request, as indicated. If the received IO request is not a low priority read request, the process moves to step 306.

In step 306, a determination is made as to whether or not the received IO request is a read request of high priority. If the received IO request is a high priority read request, the request is placed in the SYNC queue in step 308, and then the process returns to step 300 to handle the next received IO request, as indicated. If the received IO request is not a high priority read request, the process moves to step 310.

In step 310, a determination is made as to whether or not the received IO request is a typical write request. For example, a typical write request is illustratively a write request that is not a high priority write request. If the received IO request is a typical write request, the request is placed in the BKG queue in step 312, and then the process returns to step 300 to handle the next received IO request, as indicated. If the received IO request is not a typical write request, the process moves to step 314.

In step 314, the processing core provides other handling for any non-typical write request, such as, for example, placing a high priority write request in the SYNC queue or in the INTERMEDIATE queue. Other additional or alternative types of processing can be provided for non-typical write requests. In some embodiments, typical write requests comprise low or medium priority write requests, while non-typical write requests comprise high priority write requests, although other factors can be used to determine whether a given write request is typical or non-typical in other embodiments.

In step 316, which is illustratively shown in dashed outline to indicate that it may be performed at least in part continuously throughout the FIG. 3 process, monitoring for starvation of IO requests in the BKG queue is performed. If starvation is detected, the process will temporarily use the INTERMEDIATE queue instead of the SYNC queue for high priority read requests in step 308. Accordingly, in each of one or more iterations of step 308 subsequent to detection in step 316 of starvation of IO requests in the BKG queue, step 308 is modified such that a received high priority read request is placed in the INTERMEDIATE queue instead of in the SYNC queue, and such diversion of high priority read requests from the SYNC queue to the INTERMEDIATE queue can continue as long as the starvation condition persists. The process returns from step 316 to step 300 to handle the next received IO request, as indicated. However, it is to be appreciated that the starvation monitoring and detection of step 316 can additionally or alternatively be performed elsewhere in the FIG. 3 process, such as in conjunction with performance of each of one or more of the other steps.

Multiple instances of the FIG. 3 process may be performed in parallel for different sets of IO operations handled by the processing core, and similar multiple instances can be performed in parallel for sets of IO operations handled by each of the other processing cores, possibly on each of multiple storage nodes of the storage system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller comprising at least a portion of each of one or more of the processing devices 108 of storage system 105 and configured to control performance of one or more steps of the process of FIG. 3 in system 100 can be implemented as part of what is more generally referred to herein as a processing platform comprising one or more processing devices each comprising a processor coupled to a memory. A given such storage controller may correspond to one or more virtual machines or other types of virtualization infrastructure such as Docker containers or Linux containers (LXCs). The storage controller, as well as other system components, may be implemented at least in part using processing devices of such processing platforms. For example, in a distributed implementation, respective distributed modules of such a storage system 105 can be implemented in respective containers running on respective ones of the processing devices of a processing platform.

Additional illustrative embodiments implementing read latency reduction functionality will now be described with reference to FIGS. 4 and 5.

Figure 4:
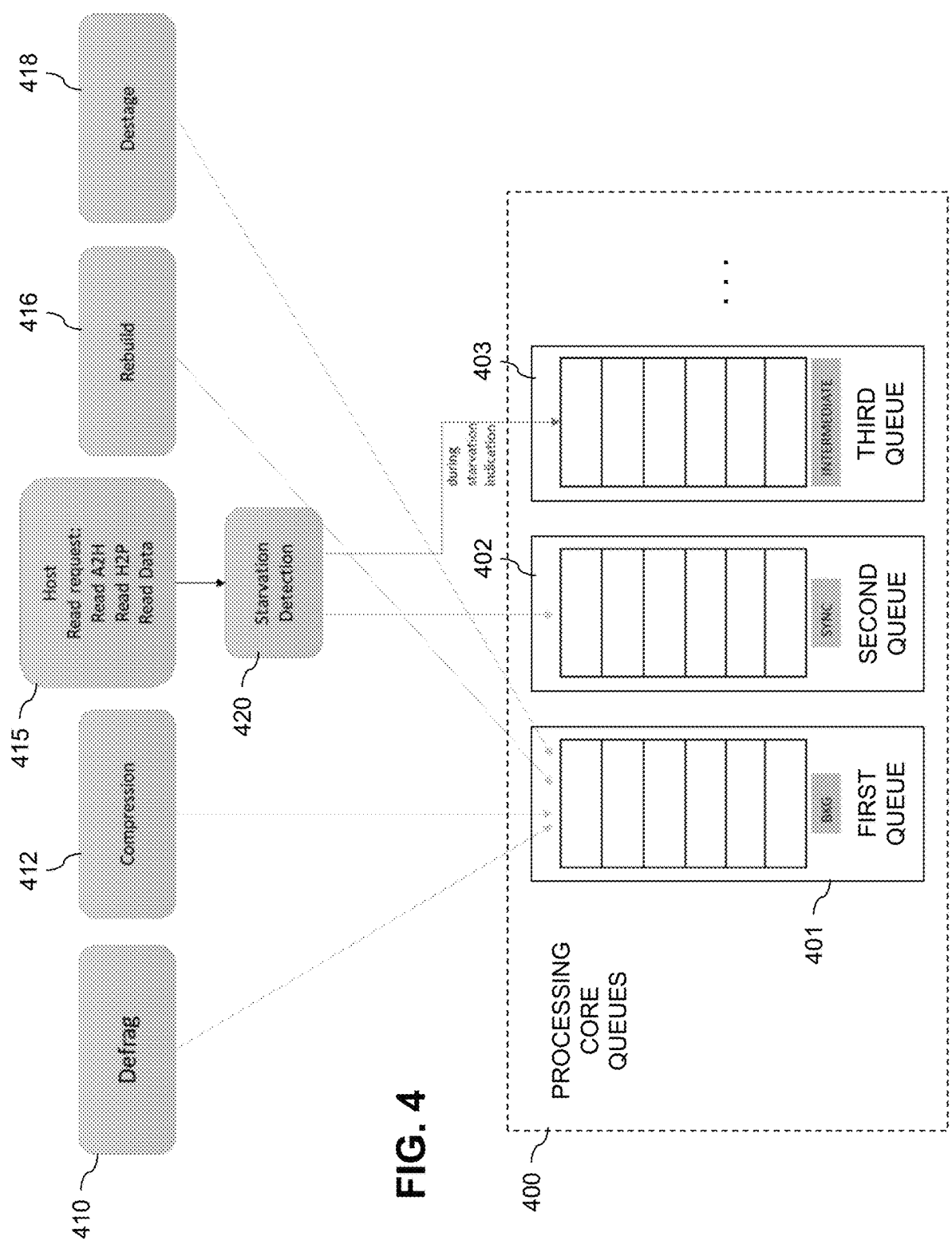
FIG. 4 shows routing of different types of IO operations to different queues associated with read latency reduction in an illustrative embodiment.

Referring now to FIG. 4, this figure shows a set of processing core queues 400 that receive IO requests from process flows executing on the storage system 105. The processing core queues 400 are associated with a single processing core, and other processing cores can have similar sets of queues. The set of processing core queues 400 comprises a first queue 401, a second queue 402 and a third queue 403, illustratively comprising respective instances of a BKG queue, a SYNC queue and an INTERMEDIATE queue of the type described elsewhere herein. The BKG queue in this embodiment is implemented as a WRR class submission queue with a low priority level, the SYNC queue is implemented as an urgent class submission queue, and the INTERMEDIATE queue is implemented as a WRR class submission queue with a medium priority level. The INTERMEDIATE queue is therefore assigned a higher weight than the BKG queue.

Read latency reduction logic implemented in the processing core is configured to implement one or more instances of the FIG. 3 process using the set of processing core queues 400, including first, second and third queues 401, 402 and 403 corresponding to the respective BKG, SYNC and INTERMEDIATE queues described above. Additional or alternative queues can be included in the set of processing core queues 400 in other embodiments. For example, WRR queues can be replaced in other embodiments with queues using other types of selection mechanisms.

In accordance with the associated read latency reduction functionality, write requests are typically placed in the BKG queue, as are low priority read requests. Such write requests and low priority read requests in the FIG. 4 embodiment illustratively include write requests and read requests issued as part of asynchronous process flows, such as process flows associated with at least one of a defragmentation ("defrag") process 410, a compression process 412, a rebuild process 416 and a destage process 418.

High priority read requests are placed in the SYNC queue. The high priority read requests illustratively comprise read requests issued as part of synchronous process flows, such as process flows associated with reading metadata information from metadata structures including A2H tables and H2P tables and reading data using the metadata information. For example, as shown in the diagram, a synchronous process flow associated with a host read process 415 comprises a host read request. The host read request illustratively includes multiple distinct sub-requests, including read A2H, read H2P, and read data, executed in that order. Each of these three sub-requests of the host read request in the present example is considered a type of "read request" as that term is broadly used herein.

It can be seen from the figure that each of these high priority read requests is directed to the SYNC queue, illustratively via a starvation detection component 420 that implements functionality of the type previously described in conjunction with step 316 of the FIG. 3 process. The starvation detection component 420 monitors for starvation of IO requests in the BKG queue, and if such starvation is detected, temporarily diverts high priority read requests to the INTERMEDIATE queue instead of sending them to the SYNC queue. This diversion is illustrated by the arrow labeled "during starvation indication" in the figure, between starvation detection component 420 and the INTERMEDIATE queue.

For example, the starvation detection component 420 can be configured to monitor various other components of the storage system that would likely be impacted by starvation of certain types of IO requests. One such component that is illustratively monitored by the starvation detection component is a write cache of the storage system, and such monitoring can include monitoring a free percentage of the write cache. An unusually low free percentage can indicate that write requests placed in the BKG queue are being starved of processing resources in the storage system.

Another example of a component that can be monitored by the starvation detection component 420 is rebuild process 416, which is a process of recovering lost data due to storage drive failures. In this case, an unusually slow rebuild progression could be indicative of write requests placed in the BKG queue being starved of processing resources. It is important to detect and alleviate this condition, as until the rebuild process is complete, the system is vulnerable to more drive failures that could lead to data corruption. Additional or alternative storage system components can be similarly monitored to detect starvation conditions.

After a determination is made by the starvation detection component 420 that the previously-detected starvation condition is cleared, subsequent high priority read requests are once again directed to the SYNC queue.

Accordingly, the FIG. 4 embodiment ensures that high priority read requests do not get "stuck" behind write requests, while also ensuring that such write requests as well as low priority read requests are not starved of processing resources. As a result, high priority read requests will be serviced earlier than they otherwise would if, for example, all read requests and write requests went into a single common queue, because they would not have to wait for previous write requests to complete. For example, a read request for a single 4 KB data page that is initiated from a synchronous process flow such as host read process 415 would be prioritized over a 2 MB write request that is related to a background operation of one of the asynchronous processes 410, 412, 416 or 418, leading to reduced read latency for that request.

In some embodiments, such functionality makes use of an NVMe arbitration mechanism supported by NVMe drives and their associated NVMe storage drivers within the storage system. Such embodiments can offload portions of the read latency reduction functionality to the NVMe drives and their associated NVMe storage drivers, and therefore can be implemented with only limited changes to existing storage system IO processing software. It is to be appreciated, however, that other embodiments need not utilize an NVMe arbitration mechanism or any other existing arbitration mechanism within the storage system.

Figure 5:
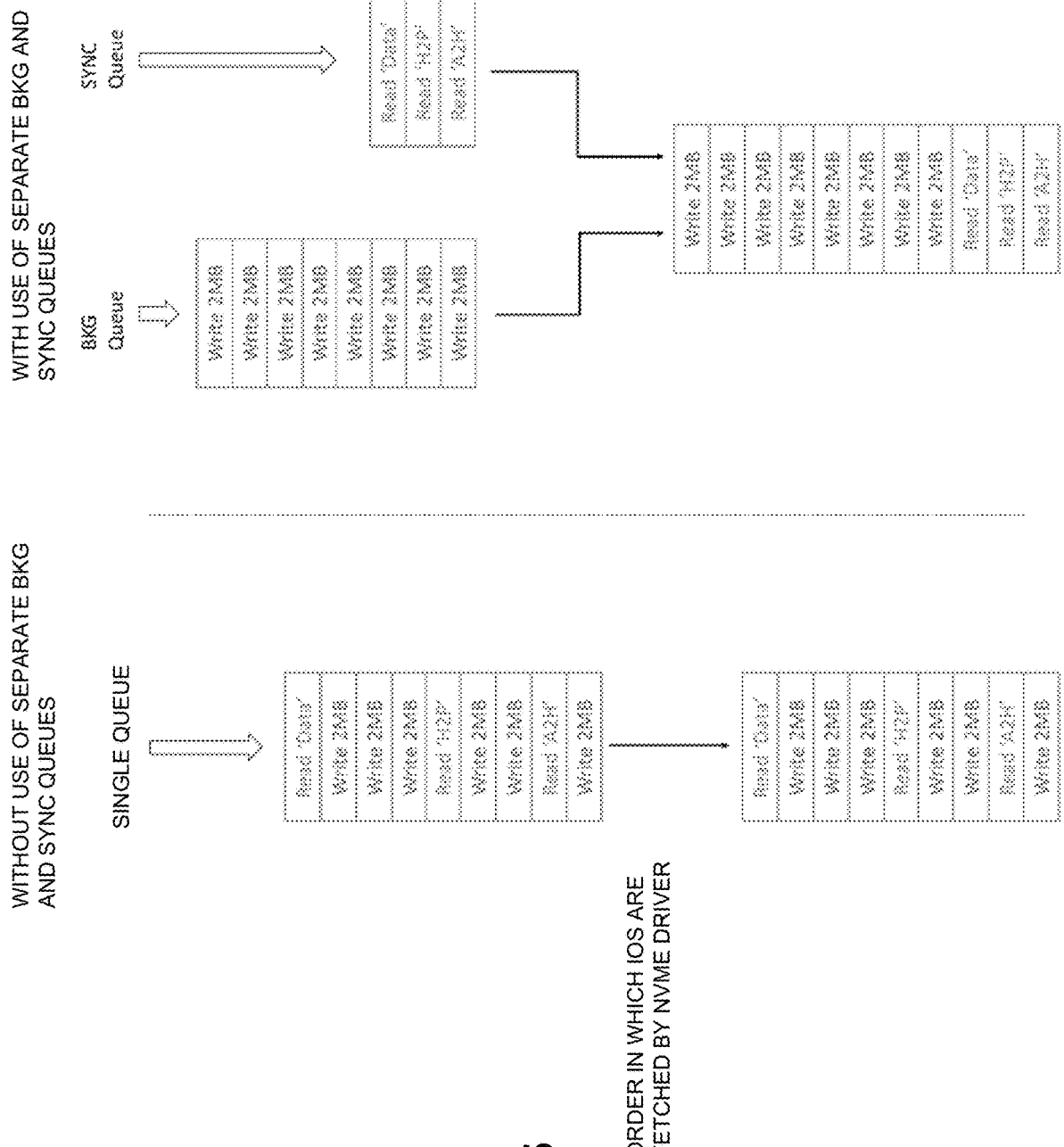
FIG. 5 illustrates features of an example read latency reduction process in one embodiment.

Turning now to FIG. 5, read latency reduction associated with an example read latency reduction process in one embodiment is shown. The left side of the figure illustrates a situation in which the above-described separate BKG and SYNC are not used, and instead all of the read and write requests of a single processing core for a particular NVMe drive are queued in a single queue, as shown in the upper portion of the left side of the figure. Accordingly, multiple write requests each comprising 2 MB write requests, illustratively from one or more of the asynchronous processes 410, 412, 416 and 418 of FIG. 4, are queued in the same queue with read A2H, read H2P and read data sub-requests of a read request for a single 4 KB data page from the host read process 415. The lower portion of the left side of the figure illustrates the order in which these IO requests are fetched from the single queue by the NVMe driver. It can be seen that the synchronous read requests are interspersed with and therefore "stuck" behind one or more of the asynchronous write requests, leading to an undesirable increase in read latency as previously described elsewhere herein.

This undesirable situation is alleviated in the FIG. 5 embodiment using the BKG separate BKG and SYNC queues as shown on the right side of the figure. In this embodiment, the asynchronous 2 MB write requests are placed in the BKG queue, and the high priority synchronous read requests are placed in the SYNC queue, as shown in the upper portion of the right side of the figure. The lower portion of the right side of the figure illustrates the order in which these IO requests are fetched from the BKG and SYNC queues by the NVMe driver. It can be seen that the synchronous read requests are retrieved first by the NVMe driver, prior to the asynchronous 2 MB write requests. This is because the read requests are in the SYNC queue, illustratively implemented as an urgent class submission queue, while the write requests are in the BKG queue, illustratively implemented as a low priority WRR class submission queue. Accordingly, the synchronous read requests are no longer "stuck" behind any of the asynchronous write requests, and read latency is therefore significantly reduced.

The FIG. 5 embodiment therefore prioritizes read IOs that are part of synchronous host read requests over IOs that are issued as part of asynchronous background operations for which the latency is less important, thereby reducing the latency of the host read requests, while also avoiding any adverse impact to the other requests through utilization of a starvation detection component of the type previously described.

It is to be appreciated that the particular features of FIGS. 4 and 5, and those of other illustrative embodiments, are presented by way of example only, and should not be construed as limiting in any way.

In some embodiments, a storage system comprises a distributed content addressable storage (CAS) system configured to support read latency reduction as disclosed herein. A distributed CAS system is also referred to herein as a clustered CAS system. A "distributed CAS system" as that term is broadly used herein includes any CAS system that is distributed across multiple storage nodes, such as the nodes 106 of storage system 105.

An illustrative embodiment of such a CAS system will now be described with reference to FIG. 6. In this embodiment, a CAS system 605 comprises a plurality of storage devices 606 and an associated storage controller 608. The CAS system 605 may be viewed as a particular implementation of the storage system 105, and accordingly is assumed to be coupled to host devices 102 via network 104 in system 100.

The storage controller 608 in the present embodiment is configured to support read latency reduction functionality of the type previously described in conjunction with FIGS. 1 through 5. For example, the CAS system 605 illustratively interacts with one or more host devices 102 to support performance of a process such as that shown in FIG. 3, in order to implement read latency reduction functionality for each of a plurality of processor cores in the CAS system 605.

The storage controller 608 includes distributed modules 616 and 618. Module 616 more particularly comprises distributed BKG, SYNC and INTERMEDIATE queues, such as those described in conjunction with FIGS. 2 and 3, and illustratively comprises multiple sets of such queues on respective ones of a plurality of distinct nodes, with the multiple sets of queues collectively supporting read latency reduction functionality for multiple processing cores as disclosed herein. Module 618 more particularly comprises distributed read latency reduction logic, illustratively configured with different instances thereof being implemented on respective ones of the distinct nodes. Each such logic instance illustratively implements one or more instances of the FIG. 3 process for its corresponding processing core.

Figure 6:
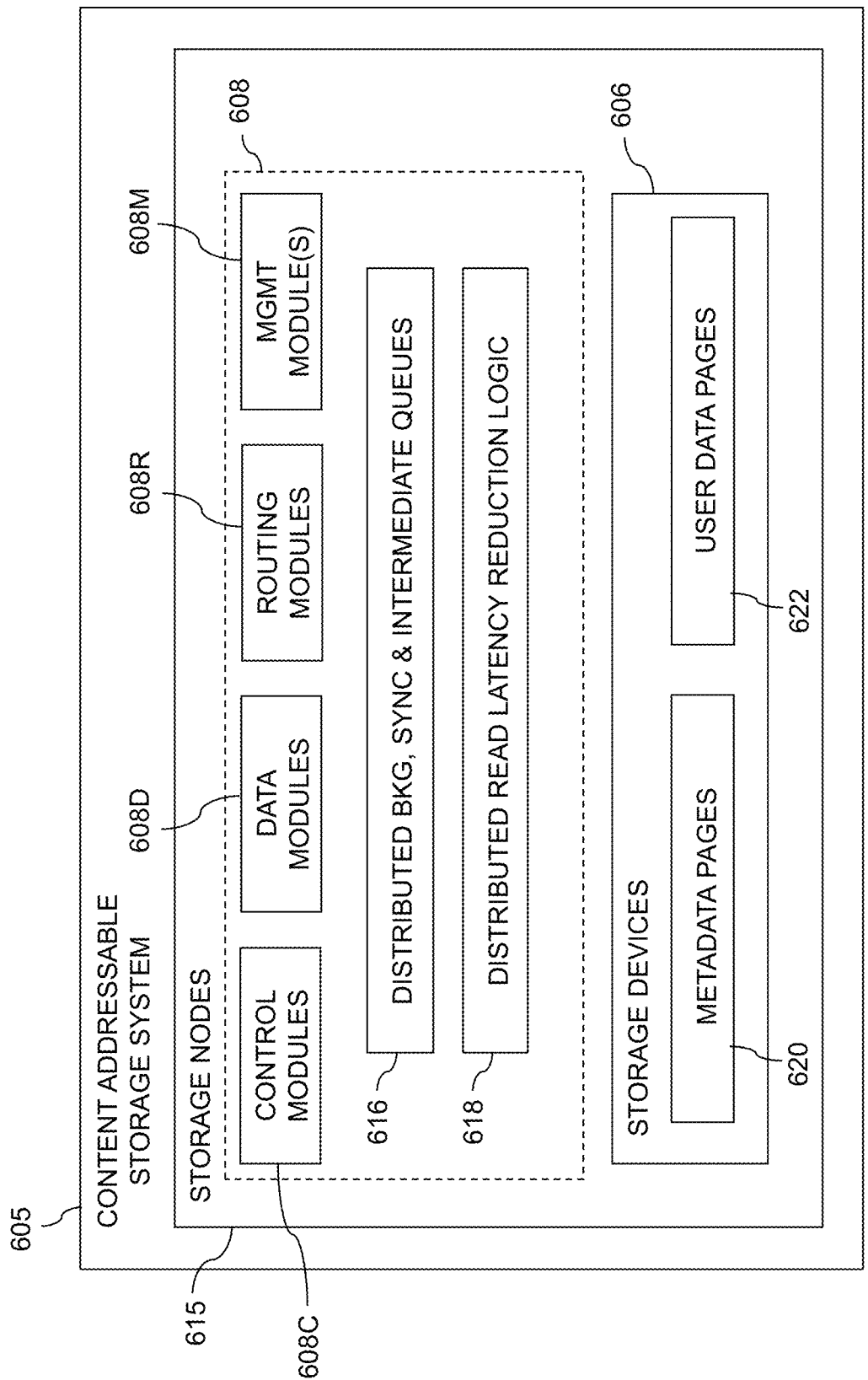
FIG. 6 shows a content addressable storage system having a distributed storage controller configured implementing read latency reduction functionality in an illustrative embodiment.

The CAS system 605 in the FIG. 6 embodiment is implemented as a distributed storage system and illustratively includes a plurality of storage nodes 615 each comprising a corresponding subset of the storage devices 606. Such storage nodes 615 are examples of the "distinct nodes" referred to above, and other distributed or clustered storage system arrangements comprising multiple storage nodes and possibly additional or alternative nodes can be used in other embodiments. A given distributed or clustered storage system may therefore include not only storage nodes 615 but also additional storage nodes, compute nodes or other types of nodes coupled to network 104. Alternatively, such additional storage nodes may be part of another distributed or clustered storage system of the system 100. Each of the storage nodes 615 of the CAS system 605 is assumed to be implemented using at least one processing device comprising a processor coupled to a memory.

The storage controller 608 of the CAS system 605 is implemented in a distributed manner so as to comprise a plurality of distributed storage controller components implemented on respective ones of the storage nodes 615. The storage controller 608 is therefore an example of what is more generally referred to herein as a "distributed storage controller." In subsequent description herein, the storage controller 608 is referred to as distributed storage controller 608.

Each of the storage nodes 615 in this embodiment further comprises a set of processing modules configured to communicate over one or more networks with corresponding sets of processing modules on other ones of the storage nodes 615. The sets of processing modules of the storage nodes 615 collectively comprise at least a portion of the distributed storage controller 608 of the CAS system 605.

The modules of the distributed storage controller 608 in the present embodiment more particularly comprise different sets of processing modules implemented on each of the storage nodes 615. The set of processing modules of each of the storage nodes 615 comprises at least a control module 608C, a data module 608D and a routing module 608R. The distributed storage controller 608 further comprises one or more management ("MGMT") modules 608M. For example, only a single one of the storage nodes 615 may include a management module 608M. It is also possible that management modules 608M may be implemented on each of at least a subset of the storage nodes 615. A given set of processing modules implemented on a particular one of the storage nodes 615 therefore illustratively includes at least one control module 608C, at least one data module 608D and at least one routing module 608R, and possibly a management module 608M.

Communication links may be established between the various processing modules of the distributed storage controller 608 using well-known communication protocols such as TCP/IP and RDMA. For example, respective sets of IP links used in data transfer and corresponding messaging could be associated with respective different ones of the routing modules 608R.

Although shown as separate modules of the distributed storage controller 608, the modules 616 and 618 in the present embodiment are assumed to be distributed at least in part over at least a subset of the other modules 608C, 608D, 608R and 608M of the storage controller 608. Accordingly, at least portions of the read latency reduction functionality of the modules 616 and 618 may be implemented in one or more of the other modules of the storage controller 608. In other embodiments, the modules 616 and 618 may be implemented as stand-alone modules of the storage controller 608.

The storage devices 606 are configured to store metadata pages 620 and user data pages 622, and may also store additional information not explicitly shown such as checkpoints and write journals. The metadata pages 620 and the user data pages 622 are illustratively stored in respective designated metadata and user data areas of the storage devices 606. Accordingly, metadata pages 620 and user data pages 622 may be viewed as corresponding to respective designated metadata and user data areas of the storage devices 606.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 620 and the user data pages 622.

The user data pages 622 are part of a plurality of LUNs configured to store files, blocks, objects or other arrangements of data, each also generally referred to herein as a "data item," on behalf of users of the CAS system 605. Each such LUN may comprise particular ones of the above-noted pages of the user data area. The user data stored in the user data pages 622 can include any type of user data that may be utilized in the system 100. The term "user data" herein is therefore also intended to be broadly construed.

A given storage volume for which content-based signatures are generated in the CAS system 605 illustratively comprises a set of one or more LUNs, each including multiple ones of the user data pages 622 stored in storage devices 606.

The CAS system 605 in the embodiment of FIG. 6 is configured to generate hash metadata providing a mapping between content-based digests of respective ones of the user data pages 622 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 622. The hash metadata generated by the CAS system 605 is illustratively stored as metadata pages 620 in the metadata area. The generation and storage of the hash metadata is assumed to be performed under the control of the storage controller 608.

Each of the metadata pages 620 characterizes a plurality of the user data pages 622. For example, in a given set of n user data pages representing a portion of the user data pages 622, each of the user data pages is characterized by a LUN identifier, an offset and a content-based signature. The content-based signature is generated as a hash function of content of the corresponding user data page. Illustrative hash functions that may be used to generate the content-based signature include the well-known SHA1 secure hashing algorithm, or other secure hashing algorithms known to those skilled in the art, including SHA2, SHA256 and many others. The content-based signature is utilized to determine the location of the corresponding user data page within the user data area of the storage devices 606.

Each of the metadata pages 620 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 620 in an illustrative embodiment comprises metadata pages having respective signatures. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 605 is illustratively distributed among the control modules 608C.

The read latency reduction functionality provided at least in part by modules 616 and 618 in this embodiment is assumed to be distributed across multiple distributed processing modules, including at least a subset of the processing modules 608C, 608D, 608R and 608M of the distributed storage controller 608.

For example, the management module 608M of the storage controller 608 may include a system management logic instance that engages corresponding system management logic instances in all of the control modules 608C and routing modules 608R in order to support read latency reduction functionality of the CAS system 605.

In some embodiments, each user data page has a fixed size such as 8 KB and its content-based signature is a 20-byte signature generated using the SHA1 secure hashing algorithm. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The distributed storage controller 608 in this example is configured to group consecutive pages into page groups, to arrange the page groups into slices, and to assign the slices to different ones of the control modules 608C. For example, if there are 1024 slices distributed evenly across the control modules 608C, and there are a total of 16 control modules in a given implementation, each of the control modules "owns" 1024/16=64 slices. In such arrangements, different ones of the slices are assigned to different ones of the control modules 608C such that control of the slices within the storage controller 608 of the CAS system 605 is substantially evenly distributed over the control modules 608C of the distributed storage controller 608.

The data modules 608D allow a user to locate a given user data page based on its signature. Each metadata page also has a size of 8 KB and includes multiple instances of the <lun_id, offset, signature> for respective ones of a plurality of the user data pages. Such metadata pages are illustratively generated by the control modules 608C but are accessed using the data modules 608D based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 605 each illustratively comprise one or more IO operations directing that at least one data item of the CAS system 605 be written to in a particular manner. A given write request is illustratively received in the CAS system 605 from a host device over a network. In some embodiments, a write request is received in the distributed storage controller 608 of the CAS system 605, and directed from one processing module to another processing module of the distributed storage controller 608. For example, a received write request may be directed from a routing module 608R of the distributed storage controller 608 to a particular control module 608C of the distributed storage controller 608. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 608C, data modules 608D and routing modules 608R of the storage nodes 615 communicate with one another over a high-speed internal network such as an InfiniBand network. The control modules 608C, data modules 608D and routing modules 608R coordinate with one another to accomplish various IO processing tasks.

The write requests from the host devices identify particular data pages to be written in the CAS system 605 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The processing modules of distributed storage controller 608 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table comprises a plurality of entries accessible utilizing logical addresses as respective keys, with each such entry of the A2H table comprising a corresponding one of the logical addresses, a corresponding one of the hash handles, and possibly one or more additional fields.

2. A hash-to-data ("H2D") table that illustratively comprises a plurality of entries accessible utilizing hash handles as respective keys, with each such entry of the H2D table comprising a corresponding one of the hash handles, a physical offset of a corresponding one of the data pages, and possibly one or more additional fields.

3. A hash metadata ("HMD") table illustratively comprising a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages. The H2D table, HMD table and other similar tables are also referred to herein as H2P tables.

4. A physical layer based ("PLB") table that illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length.

Again, the logical layer and physical layer mapping tables referred to above are examples only, and can be varied in other embodiments. For example, other types of H2P tables may be used in addition to or in place of the above-noted HMD and PLB tables.

In some embodiments, certain ones of the above-described mapping tables are maintained by particular modules of distributed storage controller 608. For example, the mapping tables maintained by the control modules 608C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The CAS system 605 utilizes a two-level mapping process to map logical block addresses to physical block addresses. The first level of mapping uses an A2H table and the second level of mapping uses an HMD table, with the A2H and HMD tables corresponding to respective logical and physical layers of the content-based signature mapping within the CAS system 605. The HMD table or a given portion thereof in some embodiments disclosed herein is more particularly referred to as an H2D table, although it is to be understood that these and other mapping tables or other data structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 606. This is also referred to as physical layer mapping.

Examples of these and other metadata structures utilized in illustrative embodiments were described above. These particular examples illustratively include respective A2H, H2D, HMD and PLB tables. In some embodiments, the A2H and H2D tables are utilized primarily by the control modules 608C, while the HMD and PLB tables are utilized primarily by the data modules 608D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 605. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 605 correspond to respective physical blocks of a physical layer of the CAS system 605. The user data pages of the logical layer are organized by LBA and have reference via respective content-based signatures to particular physical blocks of the physical layer.

Each of the physical blocks has an associated reference count that is maintained within the CAS system 605. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 608C, 608D, 608R and 608M as shown in the FIG. 6 embodiment is presented by way of example only. Numerous alternative arrangements of processing modules of a distributed storage controller may be used to implement read latency reduction functionality for a distributed storage system in other embodiments.

Additional examples of content addressable storage functionality implemented in some embodiments by control modules 608C, data modules 608D, routing modules 608R and management module(s) 608M of distributed storage controller 608 can be found in U.S. Pat. No. 9,104,326, entitled "Scalable Block Data Storage Using Content Addressing," which is incorporated by reference herein. Alternative arrangements of these and other storage node processing modules of a distributed storage controller in a CAS system can be used in other embodiments.

Illustrative embodiments of a storage system with read latency reduction functionality as disclosed herein can provide a number of significant advantages relative to conventional arrangements.

For example, illustrative embodiments disclosed herein are advantageously configured to provide substantially improved performance in situations in which a storage system is experiencing write pressure, by ensuring that processing of write requests does not unduly delay processing of read requests.

Some embodiments are advantageously configured to accelerate relatively high priority synchronous read requests that involve accessing A2H tables, H2P tables or other metadata structures of a distributed CAS system. Similar advantages are provided in a wide variety of other types of storage systems.

Such embodiments overcome the disadvantages associated with typical conventional approaches that do not adequately differentiate between read requests and write requests in queuing those requests for servicing in the storage system. For example, illustrative embodiments can prevent synchronous read requests from getting "stuck" behind asynchronous write requests, and thereby avoid corresponding latency increases, and related problems such as excessive host timeouts.

Moreover, read latency reduction provided for high priority read requests in illustrative embodiments herein does not adversely impact the performance of the storage system in handling write requests or low priority read requests.

Some embodiments are configured to make use of an NVMe arbitration mechanism supported by NVMe drives and their associated NVMe storage drivers within a given storage system, and can therefore offload portions of the read latency reduction functionality to the NVMe drives and their associated NVMe storage drivers. Such arrangements allow illustrative embodiments to be implemented with only limited changes to existing storage system IO processing software.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and/or storage systems incorporating read latency reduction functionality will now be described in greater detail with reference to FIGS. 7 and 8. Although described in the context of information processing system 100, these processing platforms may also be used to implement at least portions of other information processing systems in other embodiments.

Figure 7:
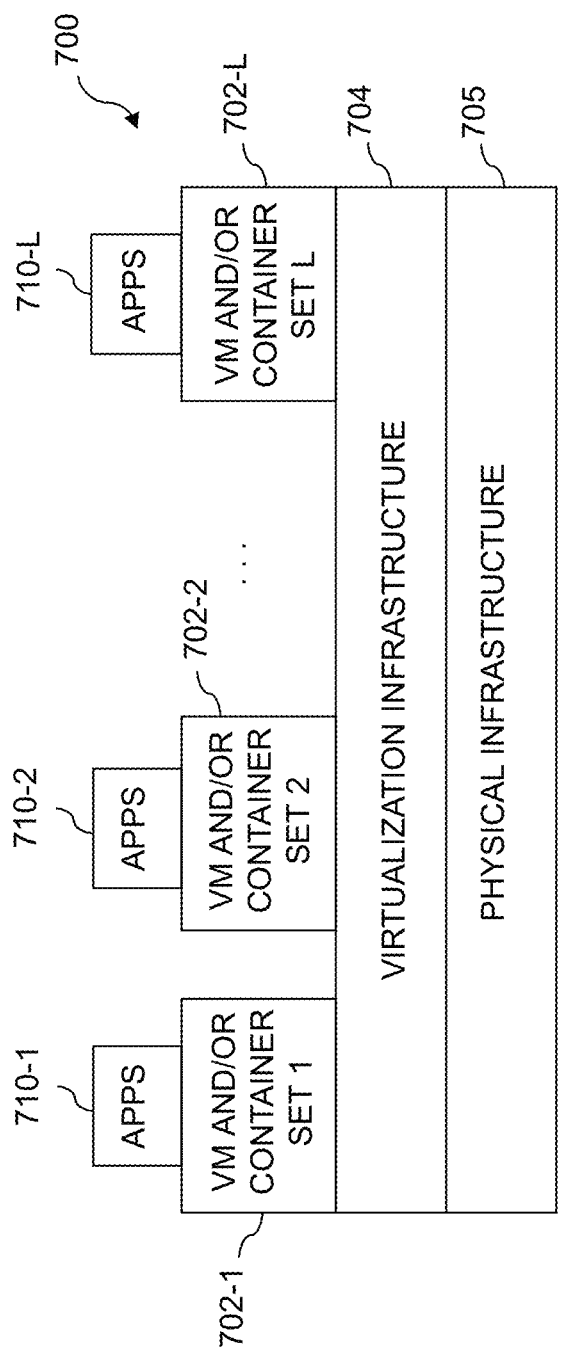
FIGS. 7 and 8 show examples of processing platforms that may be utilized to implement at least a portion of an information processing system in illustrative embodiments.
Figure 8:
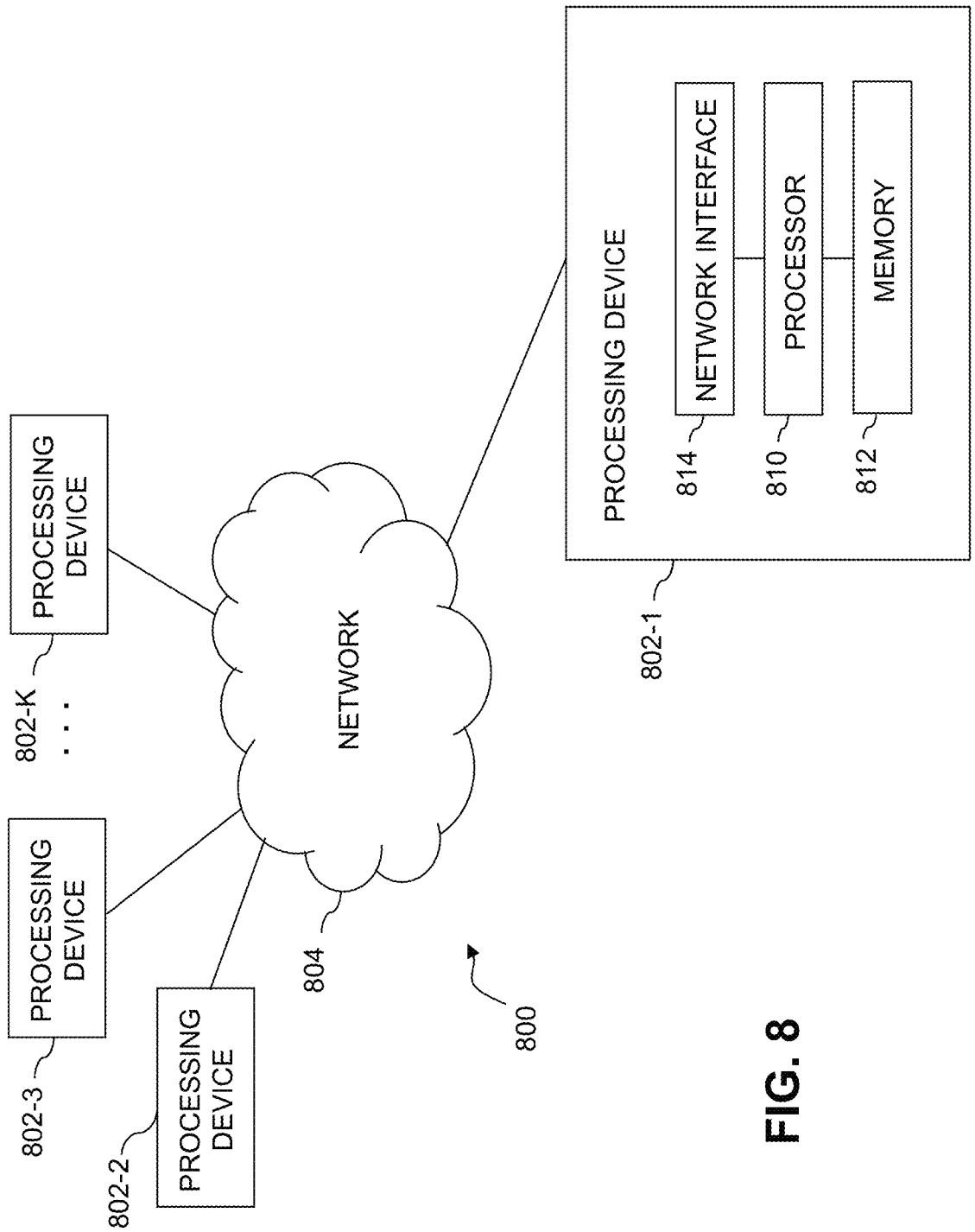

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide read latency reduction for a distributed CAS or other storage system of the type described above using one or more processes running on a given one of the VMs. For example, each of the VMs can implement one or more read latency reduction logic instances for supporting the above-described read latency reduction in the storage system 105 of system 100.

A hypervisor platform may be used to implement a hypervisor within the virtualization infrastructure 704. Such a hypervisor platform may comprise an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can also provide read latency reduction for a distributed CAS or other storage system of the type described above. For example, a container host device supporting multiple containers of one or more container sets can implement one or more read latency reduction logic instances for supporting the above-described read latency reduction in the storage system 105 of system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network such as a 4G or 5G network, a wireless network such as a WiFi or WiMAX network, or various portions or combinations of these and other types of networks.

The processing device 802-1 in the processing platform 800 comprises a processor 810 coupled to a memory 812.

The processor 810 may comprise a single-core or multi-core CPU, a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the read latency reduction functionality for a distributed CAS system or other storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, processing cores, queues, read latency reduction logic instances and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
  at least one processing device comprising a processor coupled to a memory;
  said at least one processing device being configured:
  to receive a plurality of input-output requests in a storage system, the input-output requests comprising read requests and write requests;
  to determine priorities of respective ones of the read requests;
  to place one or more of the read requests each having a relatively low priority in a first one of a plurality of queues in one of a plurality of processing cores of the storage system;
  to place one or more of the read requests each having a relatively high priority in a second one of the plurality of queues in the processing core; and
  to place the write requests in the first queue;
  wherein the storage system services the read requests and the write requests from their corresponding ones of the first and second queues;
  wherein the processing core comprising the first and second queues further comprises a third queue; and
  wherein said at least one processing device is further configured:
  to detect a condition indicating that input-output requests placed in the first queue are being underserviced by the storage system; and
  responsive to the detected condition, to at least temporarily place one or more additional received read requests each having the relatively high priority in the third queue instead of in the second queue.

2. The apparatus of claim 1 wherein said at least one processing device comprises at least a subset of the plurality of processing cores of the storage system.

3. The apparatus of claim 1 wherein the storage system comprises one or more non-volatile memory (NVM) storage device drivers each coupled to one or more NVM storage devices of the storage system and wherein the NVM storage device drivers are configured to select particular ones of the read requests and the write requests from their corresponding ones of the first and second queues.

4. The apparatus of claim 3 wherein the first queue comprises an NVM submission queue implemented as an NVM weighted round robin class queue.

5. The apparatus of claim 4 wherein the NVM submission queue implemented as an NVM weighted round robin class queue is paired with a corresponding NVM completion queue and is assigned a relatively low one of a plurality of possible priority levels available for assignment to the NVM weighted round robin class queue.

6. The apparatus of claim 3 wherein the second queue comprises an NVM submission queue implemented as an NVM urgent class queue and is paired with a corresponding NVM completion queue.

7. The apparatus of claim 1 wherein the placing of the one or more relatively high priority read requests in the second queue reduces read latency of those one or more read requests relative to that which would otherwise result if all of the read requests and the write requests were placed in the first queue.

8. The apparatus of claim 1 wherein the third queue comprises an NVM submission queue implemented as an NVM weighted round robin class queue.

9. The apparatus of claim 8 wherein the NVM submission queue implemented as an NVM weighted round robin class queue is paired with a corresponding NVM completion queue and is assigned an intermediate one of a plurality of possible priority levels available for assignment to the NVM weighted round robin class queue.

10. The apparatus of claim 1 wherein the first queue and the third queue comprise respective ones of a plurality of weighted round robin queues and wherein a weight assigned to the third queue is greater than a weight assigned to the first queue.

11. The apparatus of claim 1 wherein the one or more read requests each having a relatively low priority comprise read requests associated with asynchronous process flows and the one or more read requests each having a relatively high priority comprise read requests associated with synchronous process flows.

12. The apparatus of claim 11 wherein:
  the read requests associated with the asynchronous process flows comprise read requests associated with at least one of a defragmentation process, a compression process, a rebuilding process and a destaging process; and
  the read requests associated with the synchronous process flows comprise read requests that involve at least one of reading metadata information from metadata structures including address-to-hash tables and hash-to-physical tables and reading data using the metadata information.

13. The apparatus of claim 1 wherein the processing core of the storage system comprises a plurality of sets of the first and second queues with different ones of the sets being associated with different storage devices of the storage system.

14. The apparatus of claim 1 wherein each of the other processing cores of the storage system implements one or more sets of the first and second queues.

15. A method comprising:
receiving a plurality of input-output requests in a storage system, the input-output requests comprising read requests and write requests;
determining priorities of respective ones of the read requests;
placing one or more of the read requests each having a relatively low priority in a first one of a plurality of queues in one of a plurality of processing cores of the storage system;
placing one or more of the read requests each having a relatively high priority in a second one of the plurality of queues in the processing core; and
placing the write requests in the first queue;
wherein the storage system services the read requests and the write requests from their corresponding ones of the first and second queues;
wherein the processing core comprising the first and second queues further comprises a third queue; and
wherein the method further comprises:
detecting a condition indicating that input-output requests placed in the first queue are being underserviced by the storage system; and
responsive to the detected condition, at least temporarily placing one or more additional received read requests each having the relatively high priority in the third queue instead of in the second queue.

16. The method of claim 15 wherein the placing of the one or more relatively high priority read requests in the second queue reduces read latency of those one or more read requests relative to that which would otherwise result if all of the read requests and the write requests were placed in the first queue.

17. The method of claim 15 wherein the one or more read requests each having a relatively low priority comprise read requests associated with asynchronous process flows and the one or more read requests each having a relatively high priority comprise read requests associated with synchronous process flows.

18. A computer program product comprising a non-transitory processor-readable storage medium having stored therein program code of one or more software programs, wherein the program code when executed by at least one processing device comprising a processor coupled to a memory, causes said at least one processing device:
to receive a plurality of input-output requests in a storage system, the input-output requests comprising read requests and write requests;
to determine priorities of respective ones of the read requests;
to place one or more of the read requests each having a relatively low priority in a first one of a plurality of queues in one of a plurality of processing cores of the storage system;
to place one or more of the read requests each having a relatively high priority in a second one of the plurality of queues in the processing core; and
to place the write requests in the first queue;
wherein the storage system services the read requests and the write requests from their corresponding ones of the first and second queues;
wherein the processing core comprising the first and second queues further comprises a third queue; and
wherein the program code when executed by said at least one processing device further causes said at least one processing device:
to detect a condition indicating that input-output requests placed in the first queue are being underserviced by the storage system; and
responsive to the detected condition, to at least temporarily place one or more additional received read requests each having the relatively high priority in the third queue instead of in the second queue.

19. The computer program product of claim 18 wherein the placing of the one or more relatively high priority read requests in the second queue reduces read latency of those one or more read requests relative to that which would otherwise result if all of the read requests and the write requests were placed in the first queue.

20. The computer program product of claim 18 wherein the one or more read requests each having a relatively low priority comprise read requests associated with asynchronous process flows and the one or more read requests each having a relatively high priority comprise read requests associated with synchronous process flows.

* * * * *